(12) United States Patent
Le Chevalier et al.

(10) Patent No.: US 10,049,086 B2
(45) Date of Patent: *Aug. 14, 2018

(54) AUTHENTICATED ACCESS TO ACCREDITED TESTING SERVICES

(71) Applicant: Chegg, Inc., Santa Clara, CA (US)

(72) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,192

(22) Filed: Feb. 15, 2018

(65) Prior Publication Data

US 2018/0173680 A1    Jun. 21, 2018

Related U.S. Application Data

(63) Continuation of application No. 13/935,150, filed on Jul. 3, 2013.
(Continued)

(51) Int. Cl.
   *G06F 15/16* (2006.01)
   *G06F 17/21* (2006.01)
   (Continued)

(52) U.S. Cl.
   CPC ........ *G06F 17/212* (2013.01); *G06F 17/2735* (2013.01); *G06F 17/289* (2013.01);
   (Continued)

(58) Field of Classification Search
   CPC ....... H04L 63/08; H04L 63/102; H04L 63/10; G06F 21/6218; H04W 12/06
   (Continued)

(56) References Cited

U.S. PATENT DOCUMENTS 5,822,720 A    10/1998  Bookman et al.
5,827,070 A    10/1998  Kershaw et al.
(Continued)

FOREIGN PATENT DOCUMENTS

KR    10-0953166 B1    4/2010
WO    WO 2011/145848 A2    11/2011

OTHER PUBLICATIONS

PCT International Search Report and Written Opinion for PCT/US2013/072880, dated Mar. 14, 2014, 8 Pages.
(Continued)

*Primary Examiner* — Evans Desrosiers
(74) *Attorney, Agent, or Firm* — Kavita Aggarwal

(57) ABSTRACT

A service control system controls access to secured online testing services, such as accredited or standardized tests, examinations in educational courses, tutoring services, and continuing professional development courses or seminars. The secured services may be published by an educational publishing platform and made available to users through online configured browser applications executing on the users' devices. Based on access conditions associated with a secured testing service and the capturing and processing of one or more images, the service control system determines how users are authorized to access the services. When users have been authorized to access a service or a subset of the service, the service may be distributed through the browser applications executing on the users' devices.

20 Claims, 5 Drawing Sheets

Related U.S. Application Data

(60) Provisional application No. 61/733,728, filed on Dec. 5, 2012.

(51) Int. Cl.
*G06F 17/30* (2006.01)
*G06F 17/28* (2006.01)
*G06F 17/27* (2006.01)
*G06F 21/44* (2013.01)
*H04L 29/06* (2006.01)

(52) U.S. Cl.
CPC .... *G06F 17/3089* (2013.01); *G06F 17/30563* (2013.01); *G06F 21/44* (2013.01)

(58) Field of Classification Search
USPC .......................................................... 726/4
See application file for complete search history.

(56) References Cited

U.S. PATENT DOCUMENTS

| | | |
|---|---|---|
| 6,275,610 B1 | 8/2001 | Hall et al. |
| 6,523,001 B1 | 2/2003 | Chase |
| 7,580,831 B2 | 8/2009 | Haskell et al. |
| 7,631,254 B2 | 12/2009 | Layard et al. |
| 7,945,527 B2 | 5/2011 | Michelin |
| 8,380,493 B2 | 2/2013 | Chronister et al. |
| 8,666,961 B1 | 3/2014 | Qureshi et al. |
| 2002/0034720 A1 | 3/2002 | McManus |
| 2002/0059339 A1 | 5/2002 | McCormick et al. |
| 2003/0146977 A1* | 8/2003 | Vale ................. H04N 1/00204 348/207.1 |
| 2003/0163784 A1 | 8/2003 | Daniel et al. |
| 2004/0018479 A1 | 1/2004 | Pritchard et al. |
| 2004/0161728 A1 | 8/2004 | Benevento, II et al. |
| 2004/0191744 A1 | 9/2004 | Guirguis |
| 2004/0221013 A1 | 11/2004 | Timbadia et al. |
| 2004/0229199 A1 | 11/2004 | Ashley et al. |
| 2007/0105080 A1 | 5/2007 | Hersh |
| 2008/0021886 A1 | 1/2008 | Wanq-Aryattanwanich et al. |
| 2008/0133591 A1 | 6/2008 | Bookman et al. |
| 2008/0141182 A1 | 6/2008 | Barsness et al. |
| 2008/0147646 A1 | 6/2008 | Jaschek et al. |
| 2008/0293033 A1 | 11/2008 | Scicchitano et al. |
| 2009/0055378 A1 | 2/2009 | Alecu et al. |
| 2009/0135164 A1 | 5/2009 | Kyung et al. |
| 2009/0144614 A1 | 6/2009 | Dresevic et al. |
| 2009/0313347 A1 | 12/2009 | Engel et al. |
| 2010/0004977 A1 | 1/2010 | Marci et al. |
| 2011/0045452 A1 | 2/2011 | Bejar et al. |
| 2011/0087956 A1 | 4/2011 | Sherman et al. |
| 2011/0165550 A1 | 7/2011 | Jang |
| 2011/0223576 A1* | 9/2011 | Foster .................... G09B 7/02 434/362 |
| 2011/0236873 A1 | 9/2011 | Bowers |
| 2012/0077177 A1 | 3/2012 | Foster et al. |
| 2012/0233534 A1 | 9/2012 | Vanderwende et al. |
| 2013/0084554 A1 | 4/2013 | Shah et al. |
| 2013/0088511 A1 | 4/2013 | Mitra et al. |
| 2013/0103686 A1 | 4/2013 | Sisneros |
| 2013/0151539 A1 | 6/2013 | Shi et al. |
| 2013/0185774 A1* | 7/2013 | Morelli, Jr. ............ G06F 21/31 726/4 |
| 2013/0224718 A1 | 8/2013 | Woodward |
| 2014/0004497 A1 | 1/2014 | Wong et al. |
| 2014/0024008 A1 | 1/2014 | Sathy |
| 2014/0051054 A1 | 2/2014 | Wong et al. |
| 2014/0120516 A1 | 5/2014 | Chiang et al. |

OTHER PUBLICATIONS

PCT International Search Report and Written Opinion for PCT/US2013/072879, dated Mar. 28, 2014, 9 Pages.

Office Action for U.S. Appl. No. 13/935,150, dated Mar. 14, 2017, 18 Pages.

Office Action for U.S. Appl. No. 13/935,150, dated Dec. 24, 2015, 18 Pages.

Office Action for U.S. Appl. No. 13/935,150, dated Apr. 13, 2015, 15 Pages.

* cited by examiner

AUTHENTICATED ACCESS TO ACCREDITED TESTING SERVICES

CROSS REFERENCE TO RELATED APPLICATIONS

This application is a continuation of application Ser. No. 13/935,150, which claims the benefit of U.S. Provisional Application No. 61/733,728, filed Dec. 5, 2012, both of which are incorporated by reference in their entireties.

BACKGROUND

Field of the Invention

This invention relates to authenticating users for accessing secured testing services.

Description of the Related Art

The rapid shift to mobile Internet services is bringing content offerings to an increasingly larger number of connected devices. Experiences previously limited to a single device are now accessible across multiple devices as high volume consumer electronic platforms such as smart phones, tablets, eReaders, game systems, and Internet TVs have become new channels to receive digital documents and services. Educational services such as Massive Open Online Courses (MOOCs) leverage standardized publishing and distribution formats to seamlessly integrate and synchronize digital educational experiences across consumer devices of large numbers of users.

Although large-scale distribution of online lectures and course materials have been a focus of these new educational service platforms, it has been so far much more difficult to fully integrate other educational services, such as testing, into these platforms. In particular, it has become increasingly difficult to control access to secured services to prevent cheating, unauthorized content distribution, and other misuses of the educational services.

SUMMARY

A service control system controls access to secured online testing services, such as accredited or standardized tests, examinations in educational courses, tutoring or training services, and continuing professional development courses or seminars. The secured services may be published by an educational publishing platform and made available to users through online configured browser applications executing on the users' devices.

Each secured service may be associated with access conditions specified by an owner or author of the service and indicating how access to the service may be authorized. Based on the access conditions associated with the secured testing services, the service control system determines how users are authorized to access the services. In one embodiment, the service control system authorizes a user's access by processing at least one image of the user captured by a camera of the user's device. The number of images captured and the degree of processing performed on the images to authorize the access may be specified by the access conditions. When users have been authorized to access a service, the service may be distributed through the browser applications executing on the users' devices. In one embodiment, the service is distributed through a full-screen mode of the browser applications to control the content accessible to users during the distribution.

Embodiments of the service control system may provide an additional or alternative level of security for deploying Massive Open Online Courses (MOOCs), tutoring services, virtual testing centers, and other secured services. Moreover, embodiments of the method described herein may provide passive authorization of users that does not impede the delivery or intended user experiences of the secured services.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention provide a method for authenticating access to secured materials. In one embodiment, the method is organized around an educational digital publication and reading platform configured to aggregate, manage, and distribute digital content and online services. To protect documents from unauthorized access, the educational platform may implement several security layers to control access to and distribution of secured documents. In one aspect, the educational platform uses digital rights management (DRM) technologies to limit duplication of licensed content. In another aspect, the educational platform controls distribution and downloading of protected content by implementing security features within its delivery system, using for example secured login access, time-sensitive URLs, or geocoded location. In yet another aspect, the educational platform may implement further security measures for secured services or content to, for example, reduce online cheating. For example, these security measures may verify that the person taking a test is the intended test-taker, that he is accessing authorized materials, and that he is taking the test in a controlled online environment. The security measures implemented by the educational platform for secured services and content are described in further detail below.

Embodiments are described herein with particular reference to secured educational services, such as testing services, tutoring services, or training services. However, in other embodiments, the systems and methods described herein may be used to authenticate user access to sensitive documents, such as legal documents, classified reports, confidential memoranda, or the like.

Figure 1:
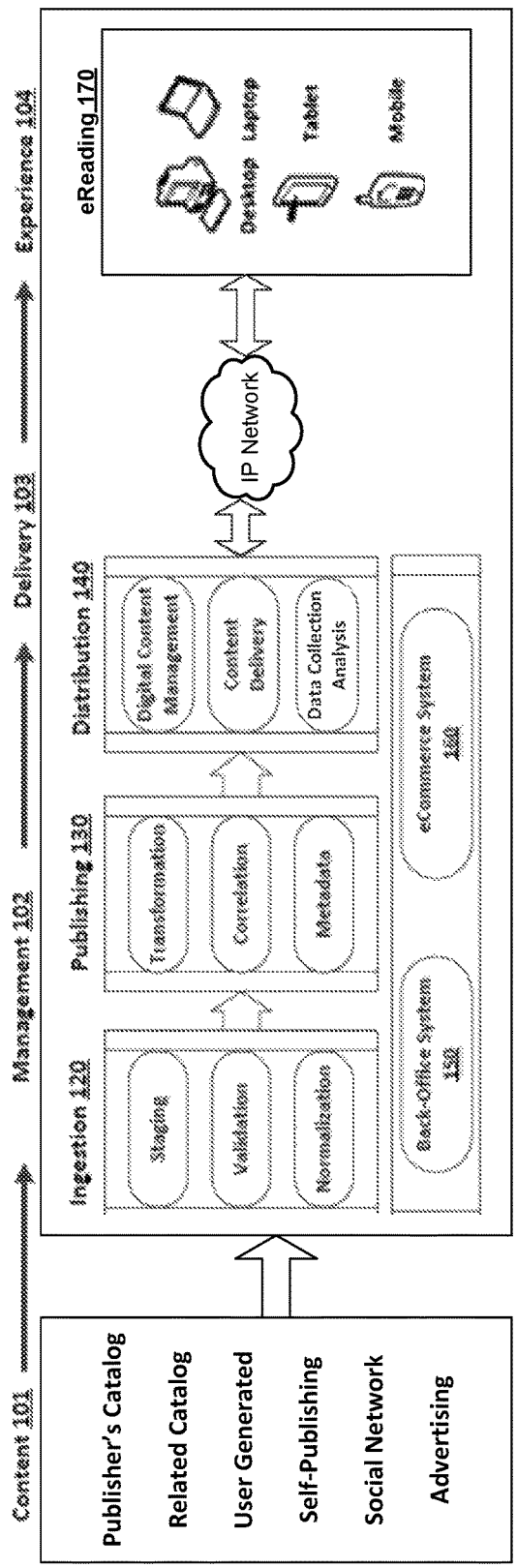
FIG. 1 illustrates an example publishing platform, according to one embodiment.

FIG. 1 is a high-level block diagram illustrating the platform environment, organized around four function blocks: content 101, management 102, delivery 103, and experience 104. Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a textbook or tradebook, a set of self-published notes, a testing document, or any other published document.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document. During reconstruction, document metadata describing a product description, pricing, and terms (e.g., whether the content is for sale, rent, or subscription, or whether it is accessible for a certain time period or geographic region, etc.) are also added to the reconstructed document.

The distribution system 140 packages content for delivery, uploads the content to content distribution networks, and makes the content available to end users based on the content's digital rights management policies. In one embodiment, the distribution system 140 generates unique access codes for each service, or portions of each service, for distribution to user devices when access to the service (or portion thereof) is authorized. The distribution system 140 may also generate time-sensitive URLs to content locations, obfuscating the link to prevent unauthorized access. In one embodiment, the distribution system 140 includes digital content management, content delivery, and data collection and analysis subsystems.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading activities, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

HTML5 Secured Testing Environment

Figure 2:
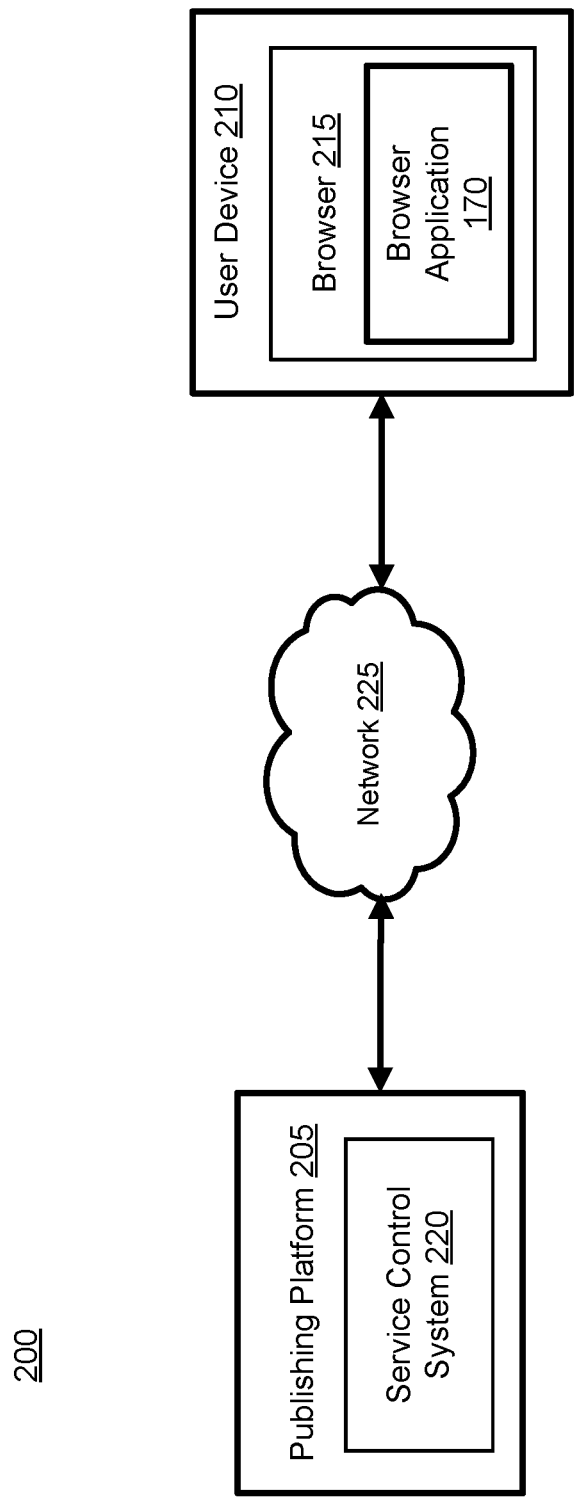
FIG. 2 illustrates a secured testing environment, according to one embodiment.

FIG. 2 illustrates a secured testing environment 200 including a publishing platform 205 and a user device 210. One user device 210 is illustrated in FIG. 2, but any number of user devices 210 may communicate with platform 205 to access the content distributed by platform 205. Each device 210 executes a web browser 215 and at least one browser application 170. In one embodiment, each user is associated with an account on the publishing platform 205, and content purchased or requested by the user through the platform 205 is made available through the user account. In one embodiment, the user device 210 may also be registered to the account to authorize the device for accessing content. Alternatively, the publishing platform 205 may establish an authenticated web session on a device 210 when the user requests to access content of the platform 205 from the device 210. Furthermore, a user may access and interact with multilayered content synchronously on a plurality of devices 210. For example, a user may simultaneously use one or more devices 210, such as a desktop computer, a laptop, a smart phone, a tablet, an eReader, an Internet television, a set-top box, or any other device including computing functionality and data communication capabilities, to interact with content distributed by the publishing platform 205.

Aspects of the publishing platform 205 may function similarly to the systems 120, 120, and 140 described with reference to the management block 102 of FIG. 1. The publishing platform 205 delivers multilayered content to the browser application 170 executing on the user device 210 through the network 225. When a user is authorized to receive content from the publishing platform 205, the online configured browser application 170 may fetch content from the platform 205 in small increments, such as one page at a time. Alternatively or additionally, the user device 210 may cache one or more pages of the document to enable faster retrieval of the pages.

Contrary to other existing digital publishing services, the educational digital publication and reading platform of the present invention allows the user to access content without downloading a specific reading or testing application from publishers. Rather, the browser application 170, comprising client software compatible with the web browser 215, constructs document pages using structureless HTML5 elements. It should be noted that browser applications 170 comprise eReading applications as well as supplemental content applications that function in the browser environment to support the user's eReading activities and overall engagement with the electronic content distributed by the platform, such as notepad applications, social applications, testing applications, and advertising applications. In one embodiment, the browser application 170 integrates a number of a user's reading activities, including reading the content, navigating between pages, creating highlights, interacting with advertisements, generating social content, taking notes in relation to the content of the document, and taking tests associated with a document. For example, the browser application 170 may upload user-generated content, such as a user's answers to test questions, to the publishing platform 205. The uploaded user-generated content is stored and archived into the on-line end user account.

In one embodiment, the electronic content distributed by the publishing platform 205 includes content related to secured testing services. Secured testing services may include accredited or standardized testing, such as the Scholastic Assessment Test (SAT), the ACT test, the General Education Development (GED) test, the Graduate Record Exam (GRE), and the like. If the secured testing service is an examination with one or more questions to be answered by users receiving the test, the publishing platform 205 may distribute the test questions to the users and receive and record each user's set of answers. As another example, secured testing services may include tutoring services, in which a tutor provides instruction tailored to a small number of students as a supplement to an educational course. In this case, the platform 205 may facilitate interactions between the tutors and students by, for example, distributing content generated by the tutor to the students, storing student coursework for review by the tutors, and establishing secure video connections for live tutoring sessions. Other examples of secured services provided by the platform 205 may include continuing professional development courses or seminars, training services, licensing examinations, and the like.

The owner or publisher of the secured service, such as a tutor or the organization providing the standardized test, may define various parameters for delivering the service. Delivery parameters may include a time that the service is to be delivered, a format of the delivery, users who may access the service, how long the service will be available to the users, a location from which users can access the service, a security level of the service, and other content distributed by the platform 205 that users can use while accessing the service. For example, if the service is a test, delivery parameters may include a list of users who have registered for the test, a time that the users are to begin taking the test, how long the users will be given to answer each question, and a textbook that the users are permitted to access during the test.

In one embodiment, the publishing platform 205 executes a service control system 220 for authorizing and verifying user access to secured testing services. When users request access to a secured service, the service control system 220 authorizes the user to access the service based on the service's defined delivery parameters. The service control system 220 may verify that the user accessing a secured service is the intended recipient of the service. In one embodiment, the service control system 220 authorizes access based on one or more images of users, controlling access to the secured services by passive authorization without interrupting the user experience of the service. A process for authorizing users to access a secured testing service based on one or more images is described in further detail below.

Communication between the publishing platform 205 and user device 210 is enabled by network 225. In one embodiment, the network 225 uses standard communications technologies and/or protocols. Thus, the network 225 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 225 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 225 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 225 can also include links to other networks such as the Internet.

Figure 3:
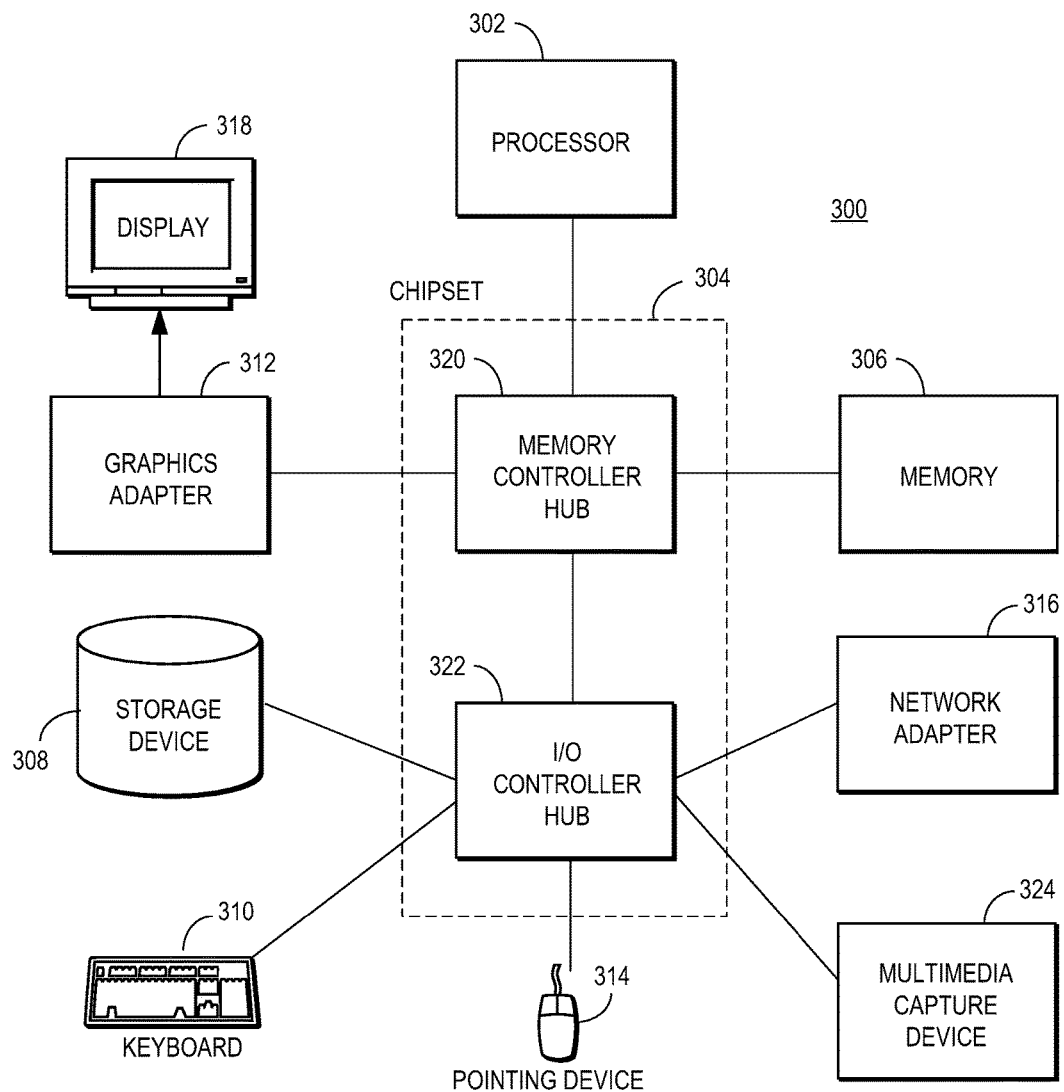
FIG. 3 is a high-level block diagram of a computer for use as a client device, according to one embodiment.

A high-level block diagram of a computer 300, as an example of a user device 210, is illustrated in FIG. 3. Illustrated are at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display device 318 is coupled to the graphics adapter 312. A storage device 308, keyboard 310, pointing device 314, multimedia capture device 324, and network adapter 316 are coupled to the I/O controller hub 322. Other embodiments of the computer 300 have different architectures. For example, the memory 306 is directly coupled to the processor 302 in some embodiments.

The storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer 300. The multimedia capture device 324 may be a camera (such as a webcam) and/or a microphone for inputting video and/or audio multimedia streams into the computer 300. The graphics adapter 312 displays images and other information on the display device 318. The network adapter 316 couples the computer 300 to a network. Some embodiments of the computer 300 have different and/or other components than those shown in FIG. 3. The types of computer 300 can vary depending upon the embodiment and the desired processing power. Other computing devices may alternatively be used as the user device 210, such as a tablet, a smart phone, an Internet television, or a gaming console.

Service Control System

Figure 4:
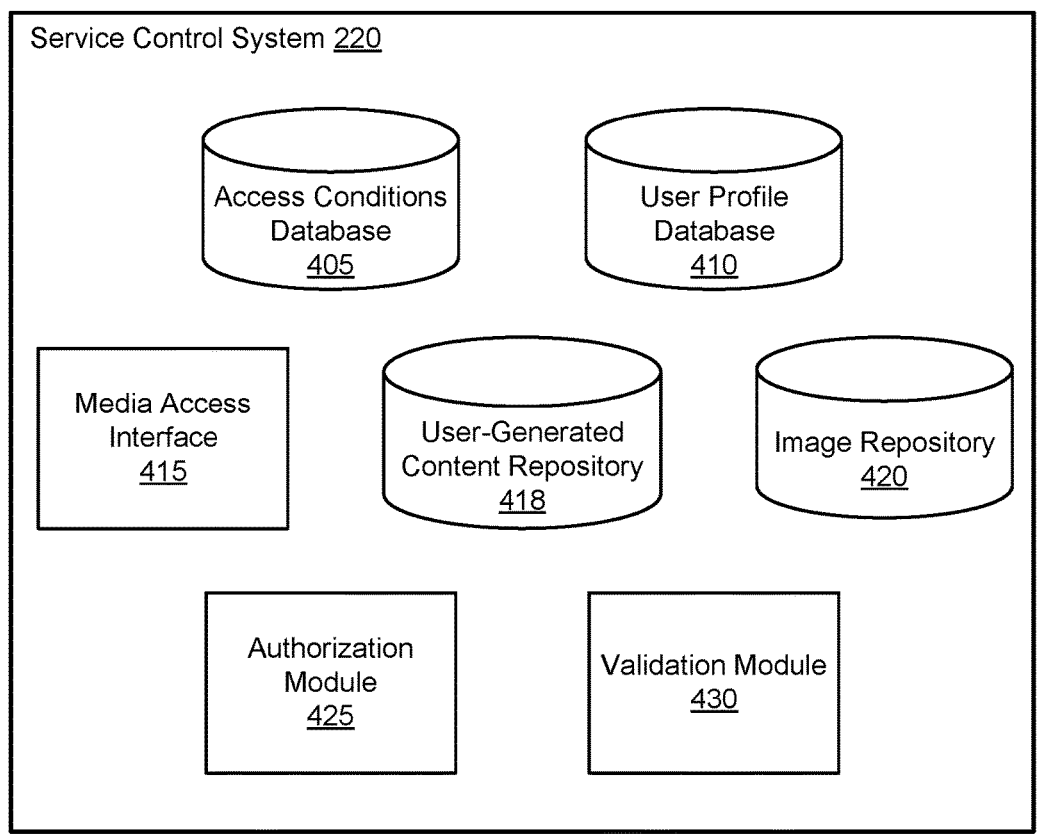
FIG. 4 is a block diagram illustrating modules within a service control system, according to one embodiment.

FIG. 4 is a block diagram illustrating modules within the service control system 220. In one embodiment, the service control system 220 includes an access conditions database 405, a user profile database 410, a media access interface 415, a user-generated content (UGC) repository 418, an image repository 420, an authorization module 425, and a validation module 430. Other embodiments of the service control system 220 may include fewer or more modules, and distribute the functionalities among the modules in a different manner.

The access conditions database 405 stores access conditions for each secured service of the platform 205. Access conditions may be specified by an author, publisher, or other owner of the secured service, and indicate how access to the secured services may be authorized. The access conditions associated with a secured service may specify a method, degree, and/or frequency at which the user is to be identified in order to gain and maintain access to the secured service. Each secured service may be associated with one or more access conditions. For example, each user requesting access to a service may be authorized to access the service if all access conditions associated with the service are met. Alternatively, a service may have different access conditions for different users, or multiple tiers of access conditions that may be applied if lower-level access conditions are not met. The selection and application of access conditions is described in further detail below.

In one embodiment, access conditions are based on processing of at least one image of a user's face captured by a camera of the device the user is using to access the secured services. For example, access conditions may specify that access can be authorized after an image of the user requesting access has been captured and stored. As another example, access conditions may specify that access can be authorized if the one or more captured images match a reference image stored for the users registered for the secured service. As yet another example, access conditions may specify that access can be authorized if there is a face in each of the one or more captured images. Still further, an access condition may specify that access can be authorized if a user is in a particular location and a video feed of the user is being monitored by a proctor. Accordingly, the access conditions for each secured service may specify how frequently images are to be captured and a degree of processing performed on the images either prior to authorizing the access or after distribution of the secured service, as a validation step. Access conditions associated with a secured testing service may have any feasible combinations of frequencies of image capture and degree of processing.

Specifically, the access conditions stored in the access conditions database 405 may specify a range of frequencies of image capture varying from once per testing session (for example, an image captured at the beginning of the session) to many times per second throughout each testing session (for example, a live video stream captured at 24 frames per second). If the secured testing service is a test with multiple questions delivered in sequence, the access condition frequency may be capturing one image for each pair of question and the user's answer. For example, if the user is given a fixed amount of time to respond to a question (a "response period"), an image may be captured during each response period. The captured images may be stored in association with an identifier of each question. Another access condition frequency may be capturing multiple images at periodic or random intervals throughout a testing session.

With respect to processing images, access conditions may specify a range of degrees of processing, from minimal (for example, store a captured image with a time stamp identifying when the image was captured) to extensive (for example, perform facial recognition on the captured images to identify and authenticate the user). Processing may alternatively comprise identifying a face in one or more images, comparing two or more images captured within a testing session by a facial recognition algorithm, or sending an image or video stream to be manually verified by a test proctor or a tutor.

The user profile database 410 stores information about the users of the educational platform, such as login credentials, images of the users for use as reference images, locations of the users, institutional affiliations (e.g., universities that the users attend), and materials the users have purchased through the educational platform. The user information may be provided by the users when they create an account on the educational platform, or may be retrieved from external databases. For example, the reference images may be retrieved from student records stored on a university server. In one embodiment, the user profile database 410 also stores information about courses, training programs, tutoring arrangements, or other educational services the users are registered to access via the platform or other online systems. Such information may include syllabi of the courses, textbooks or other documents used in the service, and the grades of the users.

The media access interface 415 accesses media streams input from multimedia devices of user devices 210, such as the multimedia capture device 324. The media access interface 415 retrieves images, video, and/or audio captured by the multimedia capture device 324, and stores the retrieved media objects in the image repository 420. In one embodiment, media access interface 415 uses an application programming interface (API), such as WebRTC, that enables real-time audio and video support within browser 215. In other embodiments, media access interface 415 accesses media streams via plug-ins downloaded to browsers 215.

In one embodiment, the media access interface 415 configures browser applications 170 to control display of secured materials on client devices 210. Depending on security conditions defined by an author or provider of a secured service, the media access interface 415 may invoke a full-screen mode in the browser 215, removing navigation controls and regulating the content presented to the user. In this case, the media access interface 415 may record state changes within the browser 215, such as the user exiting the full-screen mode.

The media access interface 415 may also receive user-generated content from the browser applications 170, such as the users' responses to test questions, and store the received content in the UGC repository 418. In one embodiment, the media access interface 415 stores the received UGC in association with the media objects in the image repository 420.

The authorization module 425 authorizes access to secured testing services based on access conditions stored in the access conditions database 405 and images stored in the image repository 420. When a user requests to access a secured testing service or a component thereof, the authorization module 425 retrieves the access conditions associated with the secured testing service and performs the image processing specified by the access conditions. If the processed image or images meet the access conditions, the authorization module 425 authorizes the access and instructs the distribution system 140 to distribute access codes for the secured service to the user's device 210. For example, an access condition may indicate that access may be authorized if an image of a user, captured when the user requests access to a service, matches the user's reference image stored in the user profile database 410. To authorize the access, the authorization module 425 may compare an image received from the device 210 to the user's reference image by a facial recognition algorithm. If a captured image matches a user's reference image, the authorization module 425 authorizes the access, and access codes for the requested service are distributed to the user's device.

If a secured service includes more than one access condition, the authorization module 425 may select the access conditions to apply for a given user based on the user's history (as stored in the user profile database 410). For example, a course's final examination may have different access conditions for different groups of students in the course based on the students' grades. Accordingly, the authorization module 425 may retrieve the students' grades in the course from the user profile database 410, and apply the access condition corresponding to the respective grades of the students when the students request access to the examination. As another example, if a user's previous tests have received flags indicating a lack of validation, the access conditions for the user may be more stringent than for users without a history of flags.

In another embodiment, the authorization module 425 may randomize access conditions applied for a set of users. For example, if a large class of students are registered for an exam, the authorization module 425 may not apply the same access conditions to each student in the class. The authorization module 425 may apply more secure access conditions to randomly-selected users, or may randomly select access conditions to apply to each user in the set. For example, the authorization module 425 may apply facial recognition algorithms to only a subset of the images of users requesting access to a test. The users who are not part of the subset may for example be authorized to access the test after images of their faces are stored, while the users who are part of the selected subset may be authorized to access the test only if the facial recognition returns a match between the captured and reference images of each user.

The validation module 430 validates user access to a secured testing service. Validation may comprise further processing of images captured by user devices. For example, if the authorization module 425 does not perform facial recognition on captured images to authorize access to a service, the validation module 430 may apply a facial recognition algorithm to authenticate the user. The validation module 430 may also correlate the authentication performed by the authorization module 425 based on information other than processed images, such as geocoded location of the users accessing a service, browser state changes, and audio recordings of the users' testing environments. Alternatively, the validation module 430 may send captured images to a tutor or instructor for manually validating the images. In one embodiment, validation is performed offline or asynchronously from the authorization and delivery of a secured service.

For secured services including examinations or other scored work, the validation module 430 may validate users' scores. The validation module 430 may flag questions of the examination or the full examination responsive to detecting anomalous conditions, such as a face not being present in an image, the user exiting a full-screen browser mode, or a failed facial recognition. Flagged items may be sent to a course instructor for further analysis.

Authenticating Access to Secured Testing Services

Figure 5:
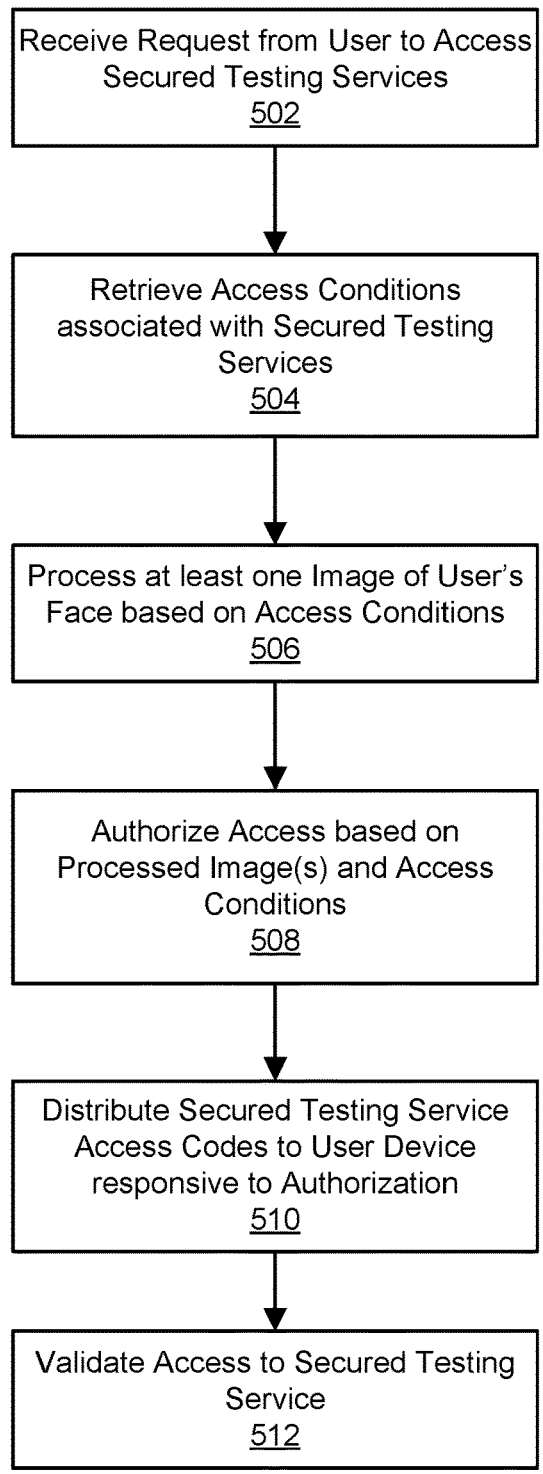
FIG. 5 is a flowchart illustrating a process for authenticating users for accessing secured testing services, according to one embodiment.

FIG. 5 is a flowchart illustrating a process for authenticating user access to secured testing services. In one embodiment, the steps of the process are performed by the service control system 220. Other embodiments perform the illustrated steps in different orders, and/or perform different or additional steps. Moreover, some of the steps may be performed by systems other than the service control system 220.

The service control system 220 receives 502 a request from a user to access a secured testing service from a user device 210. Secured testing services may be accredited testing services (such as SAT, ACT, GED, GRE, etc.), tutoring services, training services, or the like. Each secured testing service is associated with access conditions specifying how users are to be authenticated to access the service, which may be provided by a publisher, author, or provider of the service. In one embodiment, the secured testing service is configured for distribution by the publishing platform 205 through browser applications 170 executing on end user devices 210. The browser applications 170 may send identifiers of the users requesting access, such as login credentials and an image of the user, to the service control system 220 for identifying the user. In one embodiment, the users are notified that their images will be captured when they request access to a secured service, and the browser application 170 sending the user's image to the service control system 220 is dependent on the user agreeing to the service's access conditions.

When a request to access a secured service is received 502, the service control system 220 retrieves 504 the access conditions associated with the service. Based on the access conditions for the requested service, the service control system 220 may verify that the login credentials match a user registered for the secured service, and processes 506 at least one image of the user's face as captured by a camera of the user's device 210. Processing 506 may comprise, for example, storing one or more time-stamped images captured at the beginning or throughout the testing session. As another example, processing 506 may comprise comparing one or more captured images to a reference image stored in the user profile database 410 to determine a match, or comparing two or more images captured during a testing session to each other to determine if the same user has been present throughout the testing session.

If the processed images fulfill the access conditions, the service control system 220 authorizes 508 access to the secured material. Depending on the access conditions, the service control system 220 may authorize 508 access to the secured service for the duration of a user's testing session, or may authorize 508 access to a portion of the secured service. For example, if the access condition specifies that an image is to be captured during each question and answer set of a test and facial recognition is to be performed on each captured image, the service control system 220 may authorize 508 access for each question responsive to authenticating the user for that question.

When access is authorized 508, the service control system 220 distributes 510 access codes for the secured testing service (or a portion thereof) to the browser application 170 of the authorized user. The browser application 170 may then request and receive pages of content from the publishing platform 205 using the access codes. In one embodiment, the service control system 220 may instruct the browser application 170 to invoke a full-screen mode, and thereby distribute the secured service in a controlled environment. The browser application 170 may continually or periodically report security information to the service control system 220, such as images captured of the users, changes to the state of the browser 215, network disconnections, or other information that may affect or compromise the security of the content. In one embodiment, the service control system 200 is configured to store the received information for later validation of the service, or to end a testing session responsive to receiving information about a potential security breach (such as a network disconnection).

Depending on the access conditions associated with the requested services, the service control system 220 may validate 512 the user's access to the secured testing service. Validation may include processing one or more images offline or asynchronously from the authorization of the user and distribution of the service. For example, validation 512 may comprise performing facial recognition on stored images to authenticate the user who accessed a service. The validation 512 may be used by the provider of the service to analyze the performance of the user. For example, if the secured service is an examination, the user's score on the examination may depend on whether the user's access was validated. If, for example, the user who took the examination is determined to not be the user who registered for the examination, the user's access, and therefore the user's score on the examination, may be invalidated.

Embodiments of the service control system 220 as described herein beneficially provide a passive method for authorizing users to access secured service. One application of the methods described herein is implementing virtual testing centers. By authorizing, authenticating, and/or validating users accessing an electronic test, the service control system 220 may enable the delivery of secure tests to students without requiring students to visit a physical testing center. Thus, the virtual testing centers may provide secure testing for students across a country or around the world, improving the delivery of large-scale accredited or standardized tests and Massive Open Online Courses. Another application of embodiments of the service control system 220 as described herein provides controlled tutoring environments. For example, if a tutor is paid based on the number of students he tutors, it may be beneficial to ensure that multiple students are not using a single account to access the tutor's services. The service control system 220 may verify whether the students using the tutor's services are those who have registered for the service.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for authenticating users for accessing a secured testing service, the method comprising:

receiving a request from each of a first user and a second user to access the secured testing service, the secured testing service associated with a plurality of access conditions and configured for delivery through online configured browser applications executing on devices of end users;

responsive to receiving the requests, selecting from the access conditions associated with the secured testing service, a first access condition to apply to authenticate the first user and a second access condition to apply to authenticate the second user, wherein the first access condition is selected based on a first user history accessed from user profile data of the first user and the second access condition is selected based on a second user history accessed from user profile data of the second user, the first user history comprising at least one of prior grades of the first user and a history of lack of validation of prior tests of the first user, and the second user history comprising at least one of prior grades of the second user and a history of lack of validation of prior tests of the second user;

processing at least one image of a face of the first user captured by a camera of a device of the first user and at least one image of a face of the second user captured by a camera of a device of the second user;

authorizing access of the first user to the secured testing service based on the at least one processed image and the first access condition selected for the first user;

authorizing access of the second user to the secured testing service based on the at least once processed image and the second access condition selected for the second user; and responsive to authorizing the access of the first and second user, distributing the secured testing service to the first user and to the second user.

2. The computer-implemented method of claim 1, wherein the secured testing service is a test comprising one or more questions, each question having a response period, and wherein processing the at least one image of the first or second user comprises:

storing an answer to each of the one or more questions received from the first or second user; and storing an image captured during each response period of the testing document in association with the stored answer and an identifier of the question corresponding to each response period.

3. The computer-implemented method of claim 2, further comprising:

validating the test for the first or second user based on the at least one processed image of the respective user.

4. The computer-implemented method of claim 2, wherein processing the at least one image of the first or second user further comprises:

flagging the stored answers responsive to determining that one or more of the stored images does not include a face.

5. The computer-implemented method of claim 2, wherein processing the at least one image of the first or second user further comprising:

comparing each image to a reference image stored for the respective user; and responsive to one of the images not matching the reference image, flagging the stored answers.

6. The computer-implemented method of claim 2, further comprising:

detecting a change to a user interface configuration of the browser application by the first or second user; and responsive to the detected change, flagging the stored answers.

7. The computer-implemented method of claim 1, wherein processing the at least one image of the first user comprises:

storing a plurality of images of the first user captured at random intervals during a time period associated with the request from the first user to access the secured testing service.

8. The computer-implemented method of claim 7:

wherein processing the at least one image of the first user further comprises comparing at least one pair of the plurality of images to determine whether the compared pair of images match; and wherein authorizing the access of the first user to the secured testing services based on the at least one processed image and the first access condition comprises authorizing the access responsive to determining a match between the compared pair of images.

9. The computer-implemented method of claim 1, wherein the plurality of access conditions associated with the secured testing service provide different security levels, and wherein selecting the first access condition comprises:

identifying a geographic location of the first user at a time at which the first user requests to access the secured testing service;

responsive to the geographic location of the first user being a low security location, selecting a high security access condition as the first access condition; and responsive to the geographic location of the first user being a high security location, selecting a low security access condition as the first access condition.

10. The computer-implemented method of claim 1, wherein selecting the second access condition based on the user history of the second user comprises:

identifying from the user history of the second user, one or more failed authorizations of prior secured testing services the second user requested to access; and selecting a high security access condition as the second access condition responsive to identifying the failed authorizations.

11. A non-transitory computer-readable storage medium storing computer program instructions for authenticating users for accessing secured testing services, the computer program instructions comprising instructions for:

receiving a request from each of a first user and a second user to access the secured testing service, the secured testing service associated with a plurality of access conditions and configured for delivery through online configured browser applications executing on devices of end users;

responsive to receiving the requests, selecting from the access conditions associated with the secured testing service, a first access condition to apply to authenticate the first user and a second access condition to apply to authenticate the second user, wherein the first access condition is selected based on a first user history accessed from user profile data of the first user and the second access condition is selected based on a second user history accessed from user profile data of the second user, the first user history comprising at least one of prior grades of the first user and a history of lack of validation of prior tests of the first user, and the second user history comprising at least one of prior grades of the second user and a history of lack of validation of prior tests of the second user;

processing at least one image of a face of the first user captured by a camera of a device of the first user and at least one image of a face of the second user captured by a camera of a device of the second user;

authorizing access of the first user to the secured testing service based on the at least one processed image and the first access condition selected for the first user;

authorizing access of the second user to the secured testing service based on the at least once processed image and the second access condition selected for the second user; and responsive to authorizing the access of the first and second user, distributing the secured testing service to the first user and to the second user.

12. The non-transitory computer-readable storage medium of claim 11, wherein the secured testing service is a test comprising one or more questions, each question having a response period, and wherein processing the at least one image of the first or second user comprises:

storing an answer to each of the one or more questions received from the first or second user; and storing an image captured during each response period of the testing document in association with the stored answer and an identifier of the question corresponding to each response period.

13. The non-transitory computer-readable storage medium of claim 12, the computer program instructions further comprising instructions for:

validating the test for the first or second user based on the at least one processed image of the respective user.

14. The non-transitory computer-readable storage medium of claim 12, wherein processing the at least one image of the first or second user further comprises:

flagging the stored answers responsive to determining that one or more of the stored images does not include a face.

15. The non-transitory computer-readable storage medium of claim 12, wherein processing the at least one image of the first or second user further comprising:

comparing each image to a reference image stored for the respective user; and responsive to one of the images not matching the reference image, flagging the stored answers.

16. The non-transitory computer-readable storage medium of claim 12, the computer program instructions further comprising instructions for:

detecting a change to a configuration of the browser application by the first or second user; and responsive to the detected change, flagging the stored answers.

17. The non-transitory computer-readable storage medium of claim 11, wherein processing the at least one image of the first user comprises:

storing a plurality of images of the first user captured at random intervals during a time period associated with the request from the first user to access the secured testing service.

18. The non-transitory computer-readable storage medium of claim 17:

wherein processing the at least one image of the first user further comprises comparing at least one pair of the plurality of images to determine whether the compared pair of images match; and wherein authorizing the access of the first user to the secured testing services based on the at least one processed image and the first access condition comprises authorizing the access responsive to determining a match between the compared pair of images.

19. The non-transitory computer-readable storage medium of claim 11, wherein the plurality of access conditions associated with the secured testing service provide different security levels, and wherein selecting the first access condition comprises:

identifying a geographic location of the first user at a time at which the first user requests to access the secured testing service;

responsive to the geographic location of the first user being a low security location, selecting a high security access condition as the first access condition; and responsive to the geographic location of the first user being a high security location, selecting a low security access condition as the first access condition.

20. The non-transitory computer-readable storage medium of claim 11, wherein selecting the second access condition based on the user history of the second user comprises:

identifying from the user history of the second user, one or more failed authorizations of prior secured testing services the second user requested to access; and selecting a high security access condition as the second access condition responsive to identifying the failed authorizations.

\* \* \* \* \*